(12) United States Patent
Go et al.

(10) Patent No.: US 9,255,383 B2
(45) Date of Patent: Feb. 9, 2016

(54) DEVICE FOR FIXING THE HYDRAULIC PIPING OF CONSTRUCTION EQUIPMENT

(75) Inventors: Joon-Seog Go, Changwon-si (KR); Sung-Yong Jo, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 14/351,201

(22) PCT Filed: Oct. 17, 2011

(86) PCT No.: PCT/KR2011/007696
§ 371 (c)(1),
(2), (4) Date: Apr. 11, 2014

(87) PCT Pub. No.: WO2013/058413
PCT Pub. Date: Apr. 25, 2013

(65) Prior Publication Data
US 2014/0252179 A1    Sep. 11, 2014

(51) Int. Cl.
*F16L 3/22* (2006.01)
*E02F 9/14* (2006.01)
(Continued)

(52) U.S. Cl.
CPC ................. *E02F 9/14* (2013.01); *E02F 9/0875* (2013.01); *E02F 9/2275* (2013.01); *F16L 3/1033* (2013.01); *F16L 3/237* (2013.01)

(58) Field of Classification Search
CPC ......... E02F 9/14; E02F 9/2275; E02F 9/0875; F16L 3/1033; F16L 3/237
USPC .............. 248/74.1, 74.4, 316.6, 68.1; 59/78.1
See application file for complete search history.

(56) References Cited

U.S. PATENT DOCUMENTS 4,304,077 A * 12/1981 Muller ........................... 52/115
8,523,120 B2 * 9/2013 Asano et al. .................. 248/68.1
(Continued)

FOREIGN PATENT DOCUMENTS

JP    53-007821 U    1/1978
JP    H0731963 U    6/1995
(Continued)

OTHER PUBLICATIONS

International Search Report (in Korean and English) and Written Opinion (in Korean) for PCT/KR2011/007696, mailed May 7, 2012; ISA/KR.
(Continued)

*Primary Examiner* — Gwendolyn Baxter
(74) *Attorney, Agent, or Firm* — Harness, Dickey & Pierce, P.L.C.

(57) ABSTRACT

Provided is a device for fixing hydraulic piping to prevent the hydraulic piping from sliding down even when the bolt for coupling a clamp which fixes the hydraulic piping is loosened by the vibration generated during operation. The device for fixing the hydraulic piping of construction equipment includes: a piping sheet fixed to a boom structure; upper and lower clamps constituted by a fixed part fixed to the piping sheet and a concave groove for supporting the hydraulic piping; a coupling member for fixing the fixed part to the piping sheet; a hydraulic pipe fixing plate mounted on the piping sheet; a connecting hole for connecting a main pipe, which is connected to a main control valve mounted on an upper rotating body, to the hydraulic pipe disposed on the boom structure; and a bolt and nut for fixing the connecting hole to the hydraulic pipe fixing plate.

12 Claims, 4 Drawing Sheets

(51) Int. Cl.
*E02F 9/22* (2006.01)
*F16L 3/10* (2006.01)
*E02F 9/08* (2006.01)
*F16L 3/237* (2006.01)

(56) References Cited

U.S. PATENT DOCUMENTS

| | | | |
|---|---|---|---|
| 8,590,285 B2 * | 11/2013 | Hohmann et al. | 60/39.827 |
| 2004/0159751 A1 * | 8/2004 | Boon et al. | 248/74.1 |
| 2006/0043243 A1 * | 3/2006 | Asano et al. | 248/68.1 |
| 2009/0084454 A1 * | 4/2009 | Son et al. | 137/899 |
| 2013/0048826 A1 | 2/2013 | Go | |
| 2013/0276441 A1 | 10/2013 | Bae et al. | |
| 2013/0289835 A1 | 10/2013 | Bae et al. | |

FOREIGN PATENT DOCUMENTS

| | | |
|---|---|---|
| JP | H08311925 A | 11/1996 |
| JP | 2002-327453 A | 11/2002 |
| JP | 2004-137676 A | 5/2004 |
| KR | 10-2011-0045363 A | 5/2011 |
| WO | WO-8200844 A1 | 3/1982 |

OTHER PUBLICATIONS

Extended European Search Report issued by the European Patent Office (EPO) on May 7, 2015 (8 pages).

* cited by examiner the loosened due to vibration occurring during the work, the hydraulic piping can be prevented from drooping.

DEVICE FOR FIXING THE HYDRAULIC PIPING OF CONSTRUCTION EQUIPMENT

FIELD OF THE INVENTION

The present invention relates to a hydraulic piping fixing device for a construction machine. More particularly, the present invention relates to a hydraulic piping fixing device for a construction machine, in which even when bolts that fasten the clamps for securely fixing the hydraulic piping (e.g., hydraulic piping for an arm cylinder) to the upper plate of the boom structure is loosened due to vibration occurring during the work (e.g., quarry work, breaker work or the like), the hydraulic piping can be prevented for drooping.

BACKGROUND OF THE INVENTION

A conventional hydraulic piping fixing device for a construction machine in accordance with the prior art shown in FIG. 1 includes:

a piping seat 2 weldingly fixed to an upper plate of a boom structure 1 such as an excavator;

a hydraulic piping 3 (e.g., hydraulic piping for an arm cylinder) seated on the piping seat 2;

a steel clamp 5 having semi-circular shaped seating grooves formed therein to support the hydraulic piping 3; and a fastening member 6 configured to fasten the steel clamp 5 to the piping seat 2 to allow the hydraulic piping 3 to be securely fixed by the steel clamp 5 and the piping seat 2.

In this case, the hydraulic piping 3 is a metal pipe that is join-connected to a main piping (e.g., hydraulic hose) through a connector 9 mounted on an outlet side of the main piping connected at an inlet side thereof to a main control valve (MCV) 7 mounted on the upper swing structure.

As described above, if a quarry work or breaker work is performed in a state in which the hydraulic piping 3 is securely fixed to the boom structure, since vibration occurring due to an external shock is directly transferred to the hydraulic piping 3 and the steel clamp 5, leakage of hydraulic fluid occurs through a crack formed on the hydraulic piping 3 due to frequent vibration.

Meanwhile, the conventional hydraulic piping fixing device entails a shortcoming in that since the fastening member 6 is loosened from the piping seat 2 due to vibration, and the fastening member 6 loosened due to the repeated work may escape from the piping seat 2, the device is very vulnerable to vibration. Despite the disadvantage of causing damage to the machine image due to degradation of quality by the loosening of the fastening member 6 that fastens the steel clamp 5 to the piping seat, the conventional hydraulic piping fixing device constructed as an inexpensive structure is still applied to some construction sites.

FIG. 2(a) is a side view of a boom structure, and FIG. 2(b) is a cross-sectional view taken along the line A-A of FIG. 2(a).

Another conventional hydraulic piping fixing device for a construction machine in accordance with the prior art shown in FIGS. 2(a) and 2(b) includes:

a piping seat 2 weldingly fixed to an upper plate of a boom structure 1 of an excavator;

a lower clamp 10 seated on the piping seat 2;

a hydraulic piping 3 (e.g., hydraulic piping for an arm cylinder) seated on seating grooves symmetrically formed on the left and right sides of the lower clamp 10;

an upper clamp 11 configured to securely fix the hydraulic piping 3 seated on the lower clamp 10; and a fastening member 12 configured to fasten the upper clamp 11 to the lower clamp 10 to allow the hydraulic piping 3 to be securely seated on the seating grooves of the upper and lower clamps 11 and 10.

Thus, since the hydraulic piping 3 is securely fixed in a state of being not brought into direct contact with the piping seat 2, a problem associated with occurrence of vibration during the work can be overcome.

In the meantime, the conventional hydraulic piping fixing device encounters a problem in that the fastening member 12 is loosened due to vibration occurring during the quarry work or the like to cause the hydraulic piping 3 to droop in a state in which the hydraulic piping 3 is connected to the main piping 8 by means of a connector 9 and then is mounted on the upper plate of the boom structure 1.

More specifically, the main piping 8 (e.g., hydraulic hose) connected to the main control valve (MCV) mounted on the upper swing structure of the excavator and the hydraulic piping 3 mounted on the upper plate of the boom structure 1 are connected to each other using the connector 9 so as to be fit for a hydraulic circuit. Thus, the arm cylinder can be driven by a hydraulic fluid supplied from the main control valve 7 through the main piping 8 and the hydraulic piping 3.

In this case, the fastening member 12 is gradually loosened due to vibration occurring during the quarry work and thus the fastening state of the upper clamp 11 that securely fixes the hydraulic piping 3 is also released gradually. Thus, the main piping 8 forcibly pulls the hydraulic piping 3 toward the upper swing structure to cause the hydraulic piping 3 to droop.

The reason for this is that the boom structure 1 rotatably connected to the upper swing structure by the boom fixing pin 13 is pivotally driven along a given trajectory about a boom fixing pin 13 in a vertical direction, at which time, the fastening member 12 that securely fixes the upper clamp 11 to the lower clamp 10 is loosened due to vibration to cause the clamping force of the upper clamp 11 to the lower clamp 10 to be weakened.

For this reason, the main piping 8 connected to the main control valve 7 forcibly pulls the hydraulic piping 3 securely fixed between the lower clamp 10 and the upper clamp 11 to cause the hydraulic piping 3 to droop.

As described above, the hydraulic piping 3 is maintained in a state of being aligned in a straight line at an early stage in which the hydraulic piping 3 is securely mounted on the boom structure 1. However, there is caused a problem in that when the hydraulic piping 3 droops due to vibration occurring during the work, the non-matched assembly position is exposed, thereby degrading an outer appearance image of the construction machine.

For this reason, the fastening member 12 is designed to have a size larger than a reference size in order to prevent the fastening member 12 from drooping due to vibration occurring during the work. Alternatively, a separate clamp is installed in order to prevent the fastening member 12 from drooping, which leads to an increase in the number of parts, thereby deteriorating assembly workability.

DETAILED DESCRIPTION OF THE INVENTION

Technical Problems

Accordingly, the present invention has been made to solve the aforementioned problem occurring in the prior art, and it is an object of the present invention to provide a hydraulic piping fixing device for a construction machine, in which even when bolts that fasten clamps for securely fixing the hydraulic piping to an upper plate of a boom structure are loosened due to vibration occurring during the work, the hydraulic piping can be prevented for drooping so that a coating layer formed on the outer surface of the hydraulic piping can be avoided from being peeled off.

Another object of the present invention is to provide a hydraulic piping fixing device for a construction machine, in which the hydraulic piping can fixedly aligned easily in a straight line on the boom structure even without using a separate assembly jig.

Technical Solution

To accomplish the above object, in accordance with a first embodiment of the present invention, there is provided a hydraulic piping fixing device for a construction machine, including a piping seat weldingly fixed to a boom structure, a pair of upper and lower clamps having a fixing portion fixed onto the piping seat and arc-shaped grooves symmetrically formed on the left and right sides of the fixing portion to support hydraulic piping arranged on the boom structure, and a fastening member configured to securely fix the fixing portion of the upper and lower clamps to the piping seat, the hydraulic piping fixing device including:

a hydraulic piping fixing plate mounted on the piping seat;
a connector configured to joint-connect a main piping that is connected to a main control valve mounted on an upper swing structure and a hydraulic piping that is arranged on the boom structure; and
a bolt and a nut configured to securely fix the connector to the hydraulic piping fixing plate;
whereby when the fastening member is loosened due to vibration occurring during the work, the hydraulic piping are prevented from drooping by the connector fixed to the hydraulic piping fixing plate.

In accordance with a second embodiment of the present invention, there is provided a hydraulic piping fixing device for a construction machine, including a piping seat weldingly fixed to a boom structure, a pair of upper and lower clamps having a fixing portion fixed onto the piping seat and arc-shaped grooves formed to extend from the fixing portion to support a hydraulic piping arranged on the boom structure, and a fastening member configured to securely fix the fixing portion of the upper and lower clamps to the piping seat, the hydraulic piping fixing device including:

a hydraulic piping fixing plate mounted on the piping seat;
a connector configured to joint-connect a main piping that is connected to a main control valve mounted on an upper swing structure and a hydraulic piping that is arranged on the boom structure; and
a bolt and a nut configured to securely fix the connector to the hydraulic piping fixing plate
whereby when the fastening member is loosened due to vibration occurring during the work, the hydraulic piping are prevented from drooping by the connector fixed to the hydraulic piping fixing plate.

In accordance with a preferred embodiment of the present invention, the hydraulic piping fixing plate may be securely fixed to the piping seat 51 by a bolt 63 that is fastened to a screw hole 51*a* formed on a side surface of the piping seat 51.

The hydraulic piping fixing plate 58 may include a first fixing plate 66 mounted on the fixing portion 52 of the upper clamp 55, and a second fixing plate 67 which is curvedly formed to extend from the first fixing plate 66 and to which the bolt 63 for securely fixing the connector 62 to the hydraulic piping fixing plate 58 is fastened.

The hydraulic piping fixing plate may be mounted on an auxiliary piping seat weldingly fixed to the boom structure.

The nut 64 engaged with the bolt for securely fixing the connector to one surface of the hydraulic piping fixing plate may be weldingly fixed to the other surface of the hydraulic piping fixing plate.

The bolt 63 for securely fixing the connector 62 to the hydraulic piping fixing plate 58 may be primarily fastened to a screw hole 51*a* that is formed on a plate-shaped connector 62*a* fixed to the hydraulic piping side, and may be secondarily fastened to the nut 64.

Advantageous Effect

The hydraulic piping fixing device for a construction machine in accordance with an embodiment of the present invention as constructed above has the following advantages.

Even when bolts that fasten the clamps for securely fixing the hydraulic piping to the upper plate of the boom structure are loosened due to vibration occurring during the work, the hydraulic piping can be prevented for drooping so that a coating layer formed on the outer surface of the hydraulic piping can be avoided from being peeled off. In addition, the hydraulic piping can fixedly aligned easily in a straight line on the boom structure even without using a separate assembly jig, thereby improving workability.

BRIEF DESCRIPTION OF THE DRAWINGS

The above objects, other features and advantages of the present invention will become more apparent by describing the preferred embodiments thereof with reference to the accompanying drawings, in which.

EXPLANATION ON REFERENCE NUMERALS OF MAIN ELEMENTS IN THE DRAWINGS

Figure 1:
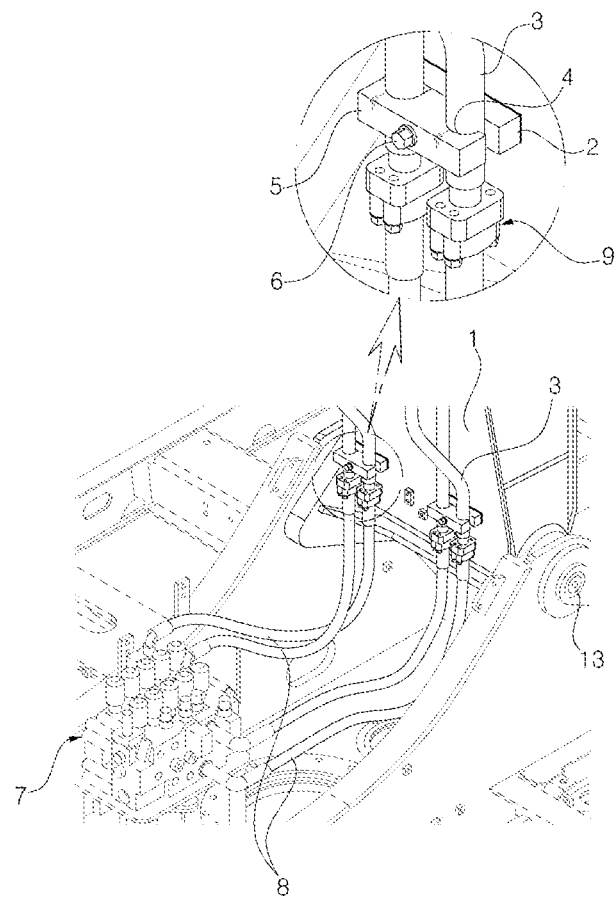
FIG. 1 is a schematic view showing a conventional hydraulic piping fixing device for a construction machine in accordance with the prior art.
Figure 2A:
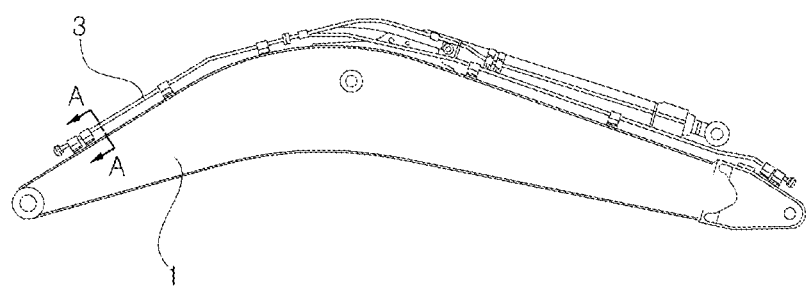
FIGS. 2(*a*) and 2(*b*) are another conventional hydraulic piping fixing device for a construction machine in accordance with the prior art.
Figure 2B:
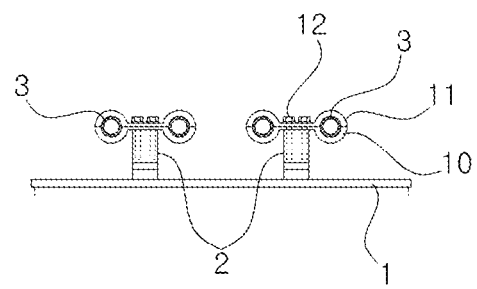

50: first rubber pad
50; boom structure
52; fixing portion
54; groove
56; lower clamp
58; hydraulic piping fixing plate
60; main piping
62; connector
64; nut
66; first fixing plate
68; auxiliary piping seat
70; lower clamp
72; fixing portion

PREFERRED EMBODIMENTS OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

A hydraulic piping fixing device for a construction machine in accordance with a first embodiment of the present invention as shown in FIGS. 3 to 7 includes a piping seat 51 weldingly fixed to a boom structure 50, a pair of upper and lower clamps 55 and 56 having a fixing portion 52 fixed onto the piping seat 51 and arc-shaped grooves 54 symmetrically formed on the left and right sides of the fixing portion 52 to support a hydraulic piping (e.g., hydraulic piping for an arm cylinder) 53 arranged on the boom structure 50, and a fastening member 57 configured to securely fix the fixing portion 52 of the upper and lower clamps 55 and 56 to the piping seat 51.

The hydraulic piping fixing device for a construction machine includes:

a hydraulic piping fixing plate 58 that is mounted on the piping seat 51;

a connector 62 (62a; a connector on a hydraulic piping 53 side/62b: a connector on a main piping 60 side) that is weldingly fixed to an end of a main piping (e.g., hydraulic hose) 60 that is connected to the main control valve (MCV) 59 mounted on an upper swing structure and an end of the hydraulic piping (e.g., metal pipe) 53 that is arranged on the boom structure 50, respectively, and joint-connects the fixed ends of the main piping and the hydraulic piping through the fastening of a bolt 61; and a bolt 63 and a nut 64 that securely fix the connector 62 to the hydraulic piping fixing plate 58, whereby when the fastening member 57 is loosened due to vibration occurring during the work, the hydraulic piping 53 is prevented from drooping by the connector 62 fixed to the hydraulic piping fixing plate 58.

Figure 3:
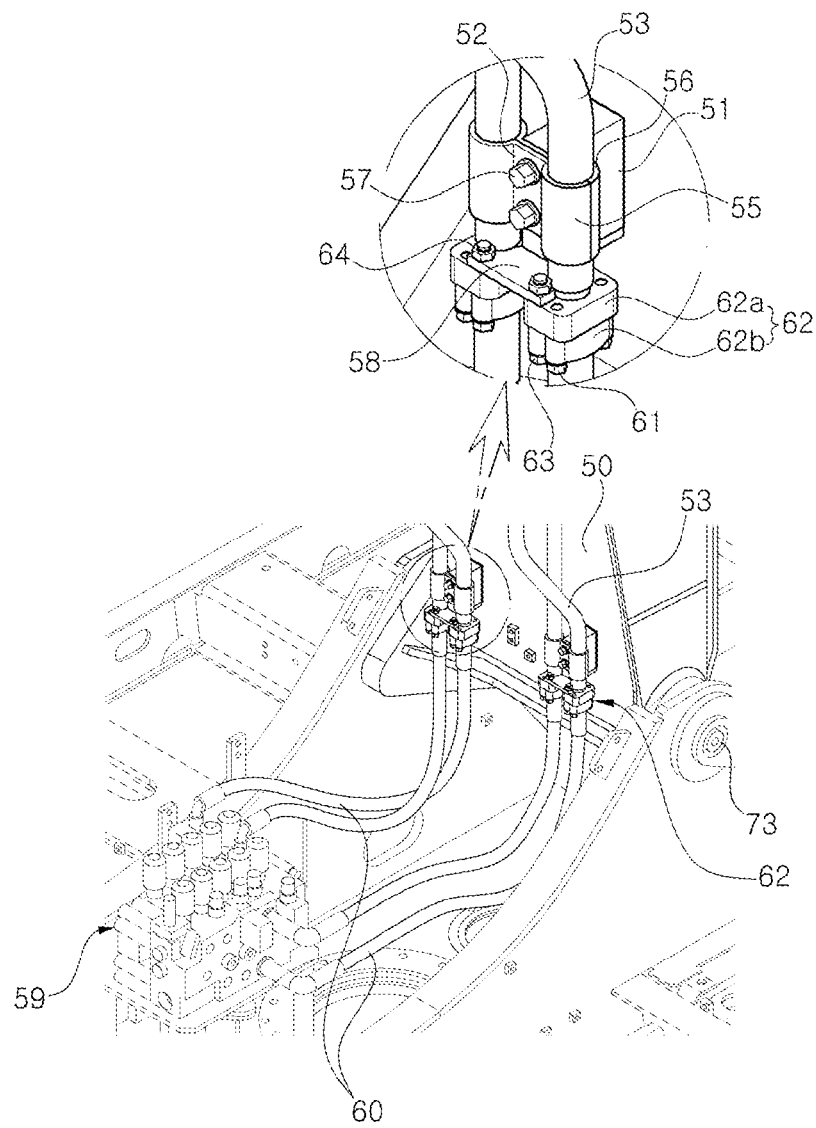
FIG. 3 is a schematic view showing a use state of a hydraulic piping fixing device for a construction machine in accordance with a first embodiment of the present invention.

As shown in FIG. 3, the bolt 63 that securely fixes the connector 62 to the hydraulic piping fixing plate 58 is primarily fastened to a screw hole 51a that is formed on a plate-shaped connector 62a fixed to the hydraulic piping 53 side, and then is secondarily fastened to the nut 64.

Figure 4:
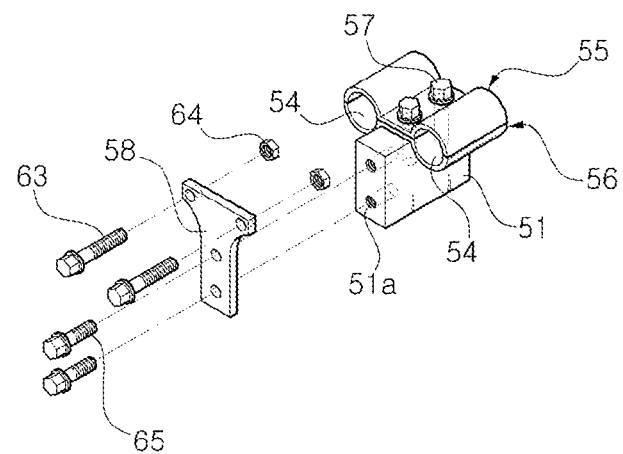
FIG. 4 is an exploded perspective view showing main elements of a hydraulic piping fixing device for a construction machine in accordance with a first embodiment of the present invention.

As shown in FIG. 4, the hydraulic piping fixing plate 58 is securely fixed to the piping seat 51 by a plurality of bolts 63 that is fastened to a plurality of screw holes 51a formed on a side surface of the piping seat 51.

Figure 6:
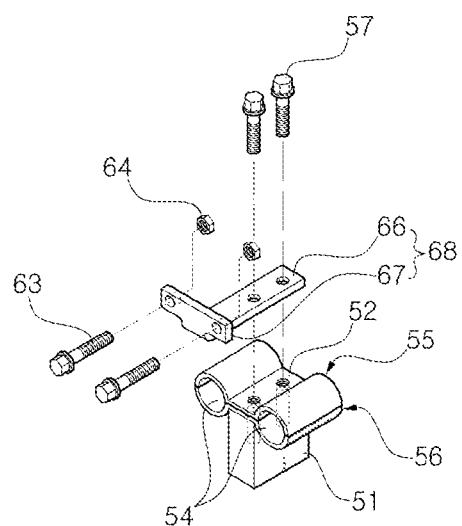
FIG. 6 is an exploded perspective view showing a modification of a hydraulic piping fixing device for a construction machine in accordance with a first embodiment of the present invention.

As shown in FIG. 6, the hydraulic piping fixing plate 58 includes a first fixing plate 66 mounted on the fixing portion 52 of the upper clamp 55 by the fastening member 57, and a second fixing plate 67 which is curvedly formed to extend from the first fixing plate 66 and to which the bolts 63 for securely fixing the connector 62 to the hydraulic piping fixing plate 58 are fastened.

In this case, the configuration of the piping seat 51 weldingly fixed to a boom structure 50, and the pair of upper and lower clamps 55 and 56 having a fixing portion 52 fixed onto the piping seat 51 by the fastening member 57 and the arc-shaped grooves 54 symmetrically formed on the left and right sides of the fixing portion 52 to support the hydraulic piping 53 is the same as that of the hydraulic piping shown in FIG. 4. Thus, the detailed description of the same configuration thereof will be omitted to avoid redundancy, and the same elements are denoted by the same reference numerals.

Figure 7:
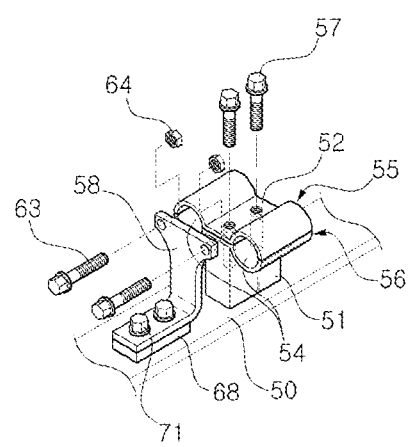
FIG. 7 is an exploded perspective view showing another modification of a hydraulic piping fixing device for a construction machine in accordance with a first embodiment of the present invention.

As shown in FIG. 7, the hydraulic piping fixing plate 58 is mounted on an auxiliary piping seat 68 weldingly fixed to the boom structure 50 by bolts 71.

In this case, the configuration of the piping seat 51 weldingly fixed to a boom structure 50, and the pair of upper and lower clamps 55 and 56 having a fixing portion 52 fixed onto the piping seat 51 by the fastening member 57 and the arc-shaped grooves 54 symmetrically formed on the left and right sides of the fixing portion 52 to support the hydraulic piping 53 is the same as that of the hydraulic piping shown in FIG. 4. Thus, the detailed description of the same configuration thereof will be omitted to avoid redundancy, and the same elements are denoted by the same reference numerals.

Although not shown in the drawings, the nut 64 engaged with the bolt 63 for securely fixing the connector 62 to one surface of the hydraulic piping fixing plate 58 is weldingly fixed to the other surface of the hydraulic piping fixing plate 58.

Hereinafter, a use example of the hydraulic piping fixing device for a construction machine in accordance with a first embodiment of the present invention will be described in detail with reference to the accompanying drawings.

Figure 5:
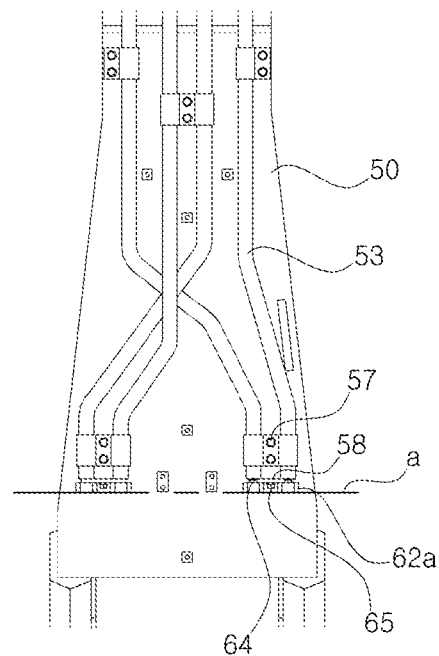
FIG. 5 is an exploded perspective view showing a state in which the hydraulic piping is fixedly aligned in a straight line on a boom structure in a hydraulic piping fixing device for a construction machine in accordance with a first embodiment of the present invention.

As shown in FIGS. 3 to 5, the lower clamp 56 is seated on the piping seat 51 weldingly fixed to the boom structure 50, and the hydraulic piping 53 is seated on the grooves formed on the left and right sides of the lower clamp 56. Thereafter, the upper clamp 55 is superimposed on the lower clamp 56 and the fastening member 57 is fastened to the piping seat 51 to securely fix the hydraulic piping 53.

In this case, as shown in FIG. 5, plate-shaped connectors 62a respectively mounted on the hydraulic piping 53 are aligned in a straight line on the boom structure 50 (indicated by a reference symbol "a"). That is, the connectors 62a are is fixed to form a straight line using the hydraulic piping fixing plate 58 fastened to the piping seat 51 by the bolts 65.

Hereinafter, a process of fixing the hydraulic piping 53 using the hydraulic piping fixing plate 58 fixed to the piping seat 51 will be described in detail.

As shown in FIGS. 3 to 5, the hydraulic piping fixing plate 58 is securely fixed to the piping seat 51 by bolts 63 that are fastened to screw holes 51a formed on a side surface of the piping seat 51.

In this case, the boom structure 50 is docked to the upper swing structure so as to joint-connect the main piping 60 that is at one end thereof to the main control valve 59 mounted the upper swing structure and the hydraulic piping 53 mounted on the boom structure 50. Thereafter, the connector 62b fixed to the other end of the main piping 60 and the connector 62a fixed to the hydraulic piping 53 are closely abut against with each other, and then the connector 62b and the connector 62a are fastened to each other by the bolts 61 so that the main piping 60 and the hydraulic piping 53 can be join-connected so as to fluidically communicate with each other.

In the meantime, the bolts 63 (for example, two bolts are used) that securely fix the connector 62; 62a, 62b to one surface of the hydraulic piping fixing plate 58 are required to have a sufficient length enough to pass through the main piping-side connector 62b, the hydraulic piping-side connector 62a, and the hydraulic piping fixing plate 58 in this order and then to be fastened to the nuts 64 on the other surface of the hydraulic piping fixing plate 58.

As described above, the connectors 62b and 62a weldingly fixed to the main piping 60 and the hydraulic piping 53, respectively, are fixed to the hydraulic piping fixing plate 58 by the bolts 63, so that even if the fastening member 57 that securely fixes the upper and lower clamps 55 and 56 to the piping seat 51 to support the hydraulic piping 53 is loosened due to vibration occurring during the quarry work or the like, the hydraulic piping 53 supported by the upper and lower clamps 55 and 56 can be prevented from drooping.

That is, the connector 62b weldingly fixed to the main piping 60 and the connector 62a weldingly fixed to the hydraulic piping 53 are closely abut against each other and then are coupled to each other by bolts 61. These connectors 62; 62a, 62b are fastened to the hydraulic piping fixing plate 58 by the bolts 63 passing therethrough.

For this reason, if the fastening member 57 by which the upper and lower clamps 55 and 56 are fixed to the piping seat 51 is loosened due to vibration occurring during the work to cause a fastening force of the upper and lower clamps 55 and 56 to weakened, the boom structure 50 is pivotally rotated about a boom fixing pin 73 in a vertical direction while forming a given trajectory, so that even when the main piping 60 pulls the hydraulic piping 53 toward the upper swing structure, the connector 62a fixed to the hydraulic piping 53 can be maintained in a state of being fixed to the hydraulic piping fixing plate 58 by the bolts 63, thereby preventing the hydraulic piping 53 from drooping.

In this case, the bolts 63 are primarily screwed to screw holes formed on the connector 62a fixed to the hydraulic piping 53 and then are secondarily fastened to nuts 64 positioned on the other surface of the hydraulic piping fixing plate 58 after passing through through-holes of the hydraulic piping fixing plate 58. Thus, the fastening force by which the connector 62a fixed to the hydraulic piping 53 is securely fixed to the hydraulic piping fixing plate 58 is maintained semipermanently so that the hydraulic piping 53 is prevented from drooping. For this reason, when the hydraulic piping 53 droops, it can be prevented that a coating layer formed on the hydraulic piping 53 is peeled off or the assembled position of the hydraulic piping 53 with respect to the boom structure 50 is not uniform to cause an outer appearance image to be degraded.

In the meantime, when the connector 62 that join-connects the hydraulic piping 53 and the main piping 60 is securely fixed to the boom structure 50, it can be fixedly aligned in a straight line on relative to the hydraulic piping fixing plate 58 fixed to the piping seat 51 without using a separate jig.

Figure 8:
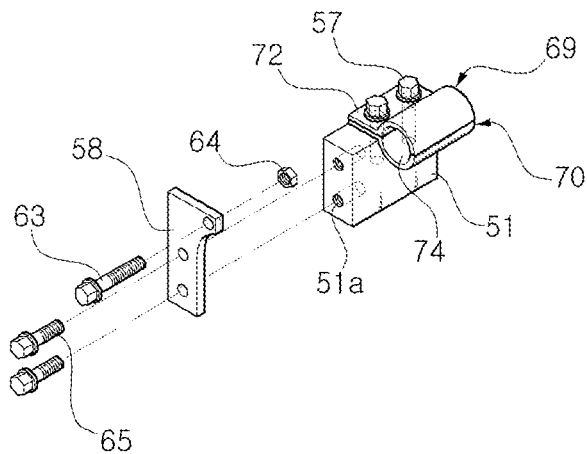
FIG. 8 is an exploded perspective view showing main elements of a hydraulic piping fixing device for a construction machine in accordance with a second embodiment of the present invention.
Figure 9:
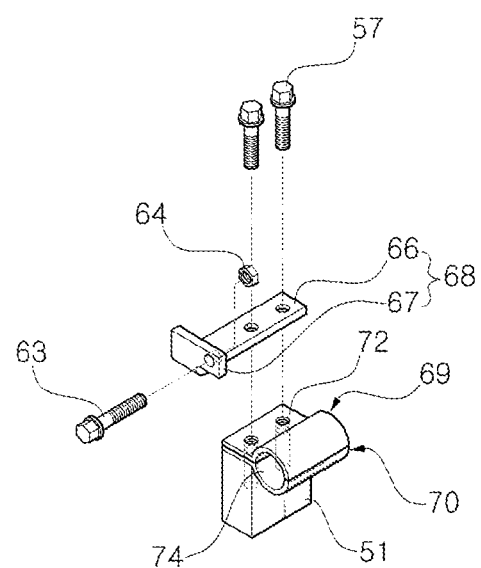
FIG. 9 is an exploded perspective view showing a modification of a hydraulic piping fixing device for a construction machine in accordance with a second embodiment of the present invention.
Figure 10:
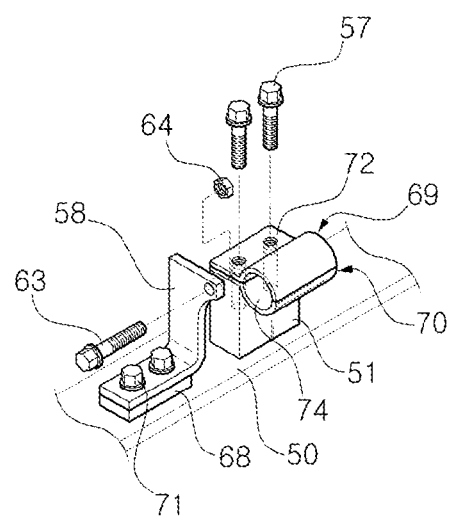
FIG. 10 is an exploded perspective view showing another modification of a hydraulic piping fixing device for a construction machine in accordance with a second embodiment of the present invention.

A hydraulic piping fixing device for a construction machine in accordance with a second embodiment of the present invention as shown in FIGS. 8 to 10 includes a piping seat 51 weldingly fixed to a boom structure 50, a pair of upper and lower clamps 69 and 70 having a fixing portion 72 fixed onto the piping seat 51 and arc-shaped grooves 74 formed to extend from one side of the fixing portion 72 to support a hydraulic piping 53 arranged on the boom structure 50, and a fastening member 57 configured to securely fix the fixing portion 72 of the upper and lower clamps 69 and 70 to the piping seat 51.

The hydraulic piping fixing device for a construction machine includes: a hydraulic piping fixing plate 58 that is mounted on the piping seat 51;

a connector 62 (62a; a connector on a hydraulic piping 53 side/62b: a connector on a main piping 60 side) that is weldingly fixed to an end of a main piping (e.g., hydraulic hose) 60 that is connected to the main control valve (MCV) 59 mounted on an upper swing structure and an end of the hydraulic piping (e.g., metal pipe) 53 that is arranged on the boom structure 50, respectively, and joint-connects the fixed ends of the main piping and the hydraulic piping through the fastening of a bolt 61; and a bolt 63 and a nut 64 that securely fix the connector 62 to the hydraulic piping fixing plate 58, whereby when the fastening member 57 is loosened due to vibration occurring during the work, the hydraulic piping 53 is prevented from drooping by the connector 62 fixed to the hydraulic piping fixing plate 58.

In this case, the configuration of the hydraulic piping fixing plate 58 mounted on the piping seat 51, the connector 62 that joint-connects the main piping 60 mounted on the upper swing structure 50 and the hydraulic piping 53 arranged on the boom structure 50, and the bolt 63 that securely fixes the connector 62 to the hydraulic piping fixing plate 58 so that even when the fastening member 57 that securely fixes the upper and lower clamps 55 and 56 to the piping seat 51 to support the hydraulic piping 53 is loosened due to vibration occurring during the work, the hydraulic piping 53 is prevented from drooping by the hydraulic piping fixing plate 58 is the same that of the hydraulic piping fixing device in accordance with the first embodiment of the present invention. Thus, the detailed description of the same configuration thereof will be omitted to avoid redundancy, and the same elements are denoted by the same reference numerals.

Hereinafter, a use example of the hydraulic piping fixing device for a construction machine in accordance with a second embodiment of the present invention will be described in detail with reference to the accompanying drawings.

As shown in FIGS. 8 to 10, the lower clamp 70 is seated on the piping seat 51 weldingly fixed to the boom structure 50, and the hydraulic piping 53 is seated on the grooves formed to extend from one side of the fixing portion 72. Thereafter, the upper clamp 69 is superimposed on the lower clamp 70 and the fastening member 57 is fastened to the piping seat 51 to securely fix the hydraulic piping 53.

As described above, since the hydraulic piping 53 supported by the upper and lower clamps 69 and 70 is fixed separately in such a manner as not to be brought into direct contact with the piping seat 51, vibration occurring during the work can be prevented from being directly transferred to the hydraulic piping 53 and the upper and lower clamps 69 and 70.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

INDUSTRIAL APPLICABILITY

As described above, according to the hydraulic piping fixing device for a construction machine in accordance with an embodiment of the present invention, even when the bolts that fasten the clamps for securely fixing the hydraulic piping to the upper plate of the boom structure are loosened due to vibration occurring during the work, the hydraulic piping can be prevented for drooping by securely fixing a flange of the hydraulic piping to the hydraulic piping fixing plate fixed to the piping seat using a separate bolt. In addition, the hydraulic piping can fixedly aligned in a straight line on the boom structure even without using a separate assembly jig.

The invention claimed is:

1. A hydraulic piping fixing device for a construction machine, including a piping seat weldingly fixed to a boom structure, a pair of upper and lower clamps having a fixing portion fixed onto the piping seat and arc-shaped grooves symmetrically formed on the left and right sides of the fixing portion to support hydraulic piping arranged on the boom structure, and a fastening member configured to securely fix the fixing portion of the upper and lower clamps to the piping seat, the hydraulic piping fixing device comprising:
a hydraulic piping fixing plate mounted on the piping seat;
a connector configured to joint-connect a main piping that is connected to a main control valve mounted on an upper swing structure and a hydraulic piping that is arranged on the boom structure; and
a bolt and a nut configured to securely fix the connector to the hydraulic piping fixing plate;
whereby when the fastening member is loosened due to vibration occurring during work, the hydraulic piping are prevented from drooping by the connector fixed to the hydraulic piping fixing plate.

2. The hydraulic piping fixing device according to claim 1, wherein the hydraulic piping fixing plate is securely fixed to the piping seat by a bolt that is fastened to a screw hole formed on a side surface of the piping seat.

3. The hydraulic piping fixing device according to claim 1, wherein the hydraulic piping fixing plate comprises a first fixing plate mounted on the fixing portion of the upper clamp, and a second fixing plate which is curvedly formed to extend from the first fixing plate and to which the bolt for securely fixing the connector to the hydraulic piping fixing plate is fastened.

4. The hydraulic piping fixing device according to claim 1, wherein the hydraulic piping fixing plate is mounted on an auxiliary piping seat weldingly fixed to the boom structure.

5. The hydraulic piping fixing device according to claim 1, wherein the nut engaged with the bolt for securely fixing the connector to one surface of the hydraulic piping fixing plate is weldingly fixed to the other surface of the hydraulic piping fixing plate.

6. The hydraulic piping fixing device according to claim 1, wherein the bolt for securely fixing the connector to the hydraulic piping fixing plate is primarily fastened to a screw hole that is formed on a plate-shaped connector fixed to a hydraulic piping side, and then is secondarily fastened to the nut.

7. A hydraulic piping fixing device for a construction machine, including a piping seat weldingly fixed to a boom structure, a pair of upper and lower clamps having a fixing portion fixed onto the piping seat and arc-shaped grooves formed to extend from the fixing portion to support a hydraulic piping arranged on the boom structure, and a fastening member configured to securely fix the fixing portion of the upper and lower clamps to the piping seat, the hydraulic piping fixing device comprising:
a hydraulic piping fixing plate mounted on the piping seat;
a connector configured to joint-connect a main piping that is connected to a main control valve mounted on an upper swing structure and a hydraulic piping that is arranged on the boom structure; and
a bolt and a nut configured to securely fix the connector to the hydraulic piping fixing plate;
whereby when the fastening member is loosened due to vibration occurring during work, the hydraulic piping are prevented from drooping by the connector fixed to the hydraulic piping fixing plate.

8. The hydraulic piping fixing device according to claim 7, wherein the hydraulic piping fixing plate is securely fixed to the piping seat by a bolt that is fastened to a screw hole formed on a side surface of the piping seat.

9. The hydraulic piping fixing device according to claim 7, wherein the hydraulic piping fixing plate comprises a first fixing plate mounted on the fixing portion of the upper clamp, and a second fixing plate which is curvedly formed to extend from the first fixing plate 66 and to which the bolt for securely fixing the connector to the hydraulic piping fixing plate is fastened.

10. The hydraulic piping fixing device according to claim 7, wherein the hydraulic piping fixing plate is mounted on an auxiliary piping seat weldingly fixed to the boom structure.

11. The hydraulic piping fixing device according to claim 7, wherein the nut engaged with the bolt for securely fixing the connector to one surface of the hydraulic piping fixing plate is weldingly fixed to the other surface of the hydraulic piping fixing plate.

12. The hydraulic piping fixing device according to claim 7, wherein the bolt for securely fixing the connector to the hydraulic piping fixing plate is primarily fastened to a screw hole that is formed on a plate-shaped connector fixed to the hydraulic piping side, and then is secondarily fastened to the nut.

* * * * *